United States Patent [19]
Sata

[11] 3,957,418
[45] May 18, 1976

[54] METHOD AND AN APPARATUS FOR PERFORMING CLOSED COMBUSTION

[76] Inventor: Naoyasu Sata, No. 80, Yamate-cho, Ashiya, Hyogo, Japan

[22] Filed: Apr. 28, 1975

[21] Appl. No.: 572,106

[30] Foreign Application Priority Data
May 9, 1974 Japan.............................. 49-50746

[52] U.S. Cl..................................... 431/9; 23/281; 60/39.52; 60/278; 431/115
[51] Int. Cl.².......................................... F23J 5/02
[58] Field of Search............. 431/2, 9, 10, 115, 116; 60/39.5, 39.52, 278, 297; 123/119 A; 23/281

[56] References Cited
UNITED STATES PATENTS

| | | | |
|---|---|---|---|
| 2,688,360 | 9/1954 | Haynes et al. | 431/115 |
| 3,146,821 | 9/1964 | Wuetig | 431/9 |
| 3,473,298 | 10/1969 | Berman | 60/39.5 |
| 3,775,976 | 12/1973 | Karig | 60/39.52 X |
| 3,851,632 | 12/1974 | Teshirogi et al. | 123/119 A |
| 3,905,773 | 9/1975 | Brooks et al. | 23/281 |

*Primary Examiner*—Edward G. Favors
*Attorney, Agent, or Firm*—Woodhams, Blanchard and Flynn

[57] ABSTRACT

A method and an apparatus for performing combustion in a closed system employing recirculated exhaust gas, by the use of a combustion chamber and an exhaust gas cleaning chamber connected by an exhaust gas duct and a recirculation pipe to the combustion chamber. The exhaust gas cleaning chamber has an oxygen supply pipe, means for supplying a pressurized aqueous solution (or oxidant-absorbing pressurized aqueous solution), a carbon dioxide supplying means, and a mixing fan. A safety pressure valve is provided on said exhaust gas cleaning chamber for discharging excess exhaust gas that becomes present in this chamber to the outside of the apparatus. The oxygen supply pipe has an oxygen flow rate regulator. An oxygen content sensor is provided in the recirculation pipe leading from the cleaning chamber to the combustion chamber and this sensor is operably connected to the oxygen flow rate regulator. In this combustion method and apparatus, because the combustion chamber is closed, practically no oxidant constituents $NO_x$ or $NO_x$ plus $SO_x$ are discharged to the atmosphere, and the supply of oxygen in the recirculating exhaust gases is regulated to be about the same as that of air (about 21 vol.%). This method and apparatus can be applied to internal combustion engines as well as to external combustion devices, such as furnaces, boilers and the like.

17 Claims, 2 Drawing Figures

METHOD AND AN APPARATUS FOR PERFORMING CLOSED COMBUSTION

BACKGROUND OF THE INVENTION

1. Field of the Invention

The present invention concerns a closed combustion system employing recirculated exhaust gas, for internal combustion engines, external fuel combustion furnaces, gas turbines, etc. In particular, this invention relates to a closed combustion system as outlined above which is arranged so that, while preventing the inflow of ambient air into the combustion system, there is recirculated to the combustion chamber the exhaust gases which contain no nitrogen taken from the atmosphere. The recirculated exhaust gases consist mainly of water vapor and carbon dioxide, both of which are inert gases. Pure oxygen and the fuel which are required for effecting the combustion are fed continuously into the system while also being sealed off from the atmosphere.

2. Description of the Prior Art

A certain level of development has been achieved in making exhaust gases clean with respect to those constituents, namely, hydrocarbons HC and carbon monoxide CO, which have not completely oxidized in the combustion process in internal combustion engines and fuel combustion furnaces. However, no satisfactory solution has been found to the problem of eliminating from the exhaust gases nitrogen oxides $NO_x$, or so-called oxidants, $NO_x$ and $SO_x$, mainly coming from nitrogen and sulfur constituents of the fuel burned in the closed system. Various efforts are being paid in various fields to find means to accomplish this goal.

In particular, the oxidants $NO_x$, or $NO_x$ plus $SO_x$, are measured usually in terms of p.p.m. and they are contained in the exhaust gases in very small amounts as compared with CO and HC which are present in the exhaust gases in such large amounts that they are usually measured in terms of volume percent. However, these oxidants constitute major ingredients of poisonous photochemical smogs and they play a great part in causing physiological injury to living things such as eye irritation, headache, cough, vomiting, and so on in human beings. Therefore, the amounts of such oxidants permitted in exhaust gases are severely limited by Environmental Protection Agency laws and regulations. Thus, vigorous research efforts are being made in various countries in order to prevent the generation, or to effect removal, of such oxidants.

As one method for producing cleaner exhaust gases, there is known the exhaust gas recirculation method. Exhaust gases are generally composed of water vapor ($H_2O$), carbon dioxide ($CO_2$), carbon monoxide (CO), unburned fuel (HC), oxidants ($NO_x$ and $SO_x$) and nitrogen ($N_2$). These constituents of exhaust gases are generated when hydrocarbon fuels are burned with air.

In the known exhaust gas recirculation method, exhaust gases having the aforesaid ingredients are recirculated to the combustion apparatus. More specifically, this known method comprises feeding back the exhaust gases to the combustion apparatus to dilute or reduce the concentration of $N_2$ which enters therein as an ingredient of incoming air and to lower the temperature at the time of combustion, thereby to reduce the production of $NO_x$. However, in such a process, the amount of $O_2$ supplied, which is indispensable for the combustion of the fuel and which must be taken from the incoming air, may be insufficient if the amount of recirculated exhaust gas is too large. Accordingly, the amount of exhaust gases which are recirculated is not permitted to be more than about 10–15 vol. %, based on the amount of incoming air. Recirculation of exhaust gases in excess of this range will result in a shortage of $O_2$ in the combustion chamber and no combustion or poor combustion will take place. Thus, according to the known exhaust gas recirculation method, the volume of recirculated exhaust gases is quite limited, i.e. on the order of only 10–15 vol.% of the exhaust gases generated, and the remainder of the exhaust gases have to be discharged as waste gases into the atmosphere. Thus, discharge of the greater part of the oxidants $NO_x$ or $NO_x$ plus $SO_x$ into the atmosphere is still taking place at present.

If there is provided a so-called closed type system which discharges substantially no exhaust gases to the outside atmosphere, but rather recirculates all of these exhaust gases completely within the combustion system, then there would be practically no exhaust gases and accordingly no air pollution will arise due to exhaust gases discharged from ordinary internal combustion engines and external fuel combustion furnaces.

However, in order that combustion may take place smoothly and continuously in this closed combustion system, it is necessary to feed not only the fuel but also oxygen to the combustion apparatus from outside the system.

By performing combustion in such a manner that inflow of air into the combustion system is possible for only a very short time at the starting of the combustion operation, and inflow of air is prevented after the combustion operation has become stable and in its place there is recirculated into the combustion system a gaseous exhaust phase which does not contain nitrogen taken from the atmosphere at all, i.e. it consists mainly of water vapor and carbon dioxide, both of which are inert gases generated by fuel combustion, and further that fuel and pure oxygen which are necessary for the combustion are continuously fed in while excluding inflow of air, it will be understood that combustion will be carried out continuously in a closed system. In this mode of combustion, an appreciable amount of nitrogen is not present in the actuating gases so that no oxidants will be generated at all. However, as the combustion continues, the fuel (HC) will be oxidized and will be transformed into water vapor and carbon dioxide. Therefore, when combustion in a closed type combustion apparatus is continued, the amount of exhaust gases will increase as time goes by, causing the pressure in the closed type combustion apparatus to increase progressively. It is necessary, therefore, to provide means for maintaining the pressure of the gas stream fed into the combustion chamber at about 1 atmosphere pressure (absolute) by an appropriate device such as a safety (pressure release) valve.

SUMMARY OF THE INVENTION

It is, therefore, a primary object of the present invention to provide a closed combustion method of the exhaust gas recirculation type, and an apparatus for use therefor, which does not discharge substantial amounts of exhaust gases contaning oxidants to the outside of the combustion system owing to its closed construction.

Another object of the present invention is to provide a method and an apparatus of the type described above, which are arranged to recirculate the major portion of the exhaust gases to effectively utilize the $CO_2$ and $H_2O$ (both chemically inert gases) generated by combustion to replace the nitrogen that would otherwise enter the combustion system if air were used.

Still another object of the present invention is to provide a method and an apparatus of the type described above, in which, even when a part of the exhaust gases are discharged into the atmosphere as a means for regulating the pressure within the system, the discharged gases contain an insufficient amount of $NO_x$ and $SO_x$ oxidants to cause a problem.

A further object of the present invention is to provide a method and an apparatus of the type described above, which are arranged so that, even when the fuel contains nitrogen and/or sulphur and these substances are converted by combustion into nitrogen oxides and/or sulphur oxides, these nitrogen and sulfur oxides are removed to the outside of the system by absorbing them in a fine mist of an aqueous solution containing an appropriate oxidant-absorbing substance, for example, $KMnO_4$ plus $KOH$, which is injected into an exhaust gas cleaning tank provided in the system.

A still further object of the present invention is to provide a method and an apparatus as described above, which have a built-in reducing (deoxidizing) means to decompose a part of the exhaust gas composition ($CO_2$ and $H_2O$ vapor) into oxygen and combustible gases ($H_2$ and $CO$) within the combustion system, whereby the consumption of both the fresh oxygen and the fuel which are supplied into the system from the outside can be reduced.

Yet a further object of the present invention is to provide a method and an apparatus as described above, which, in one aspect of the closed combustion system, are capable of use with any known combustion apparatus without making any substantial modification of such apparatus, i.e., it is necessary to add only a simple exhaust gas cleaning device between the exhaust pipe and the inlet pipe to the combustion chamber.

A further object of the present invention is to provide a method and an apparatus of the closed combustion type as described above, comprising: using a combustion system of the closed, exhaust gas recirculation-type which is shut off from the ambient atmosphere, circulating in the system the inert exhaust gases which are mainly water vapor and carbon dioxide and which are essentially completely free from nitrogen from the atmosphere, and supplying the oxygen required for the combustion into the system from a pure oxygen source provided outside of the system and which is also shut off from the ambient atmosphere, mixing said oxygen with said circulating exhaust gases within the system, feeding the mixed gas phase containing essentially no atmospheric nitrogen to a combustion means of the system to cause combustion of fuel together with the mixed gases, and recirculating the major portion of the resulting clean exhaust gases in the system, while adding fresh carbon dioxide thereto whenever necessary.

Another object of the present invention is to provide a method and an apparatus of the type described above, which are arranged so that a cleaning tank is incorporated in said apparatus for removing nitrogen oxides and sulphur oxides which are contained in the exhaust gases introduced into this tank and which are produced from the nitrogen and the sulphur contained in the fuel.

A further object of the present invention is to provide a method and an apparatus of the type described above, which further are provided with means to maintain intrasystem gas pressure at about one atmosphere pressure (absolute). Since the burning of the fuel continuously generates carbon dioxide and water vapor (which are the main products of the combustion of HC-fuel), as this fuel burns in the system, the internal pressure of the closed type combustion system will become in excess of atmospheric pressure after a certain period of time. In order to control this excess internal pressure so that the recirculated gas has about one atmosphere pressure, there is provided in the system a safety or pressure relief valve which is set to open at about one atmosphere pressure so as to discharge into the ambient air a part of the exhaust gases which have been cleaned and do not contain oxidants.

DETAILED DESCRIPTION OF THE PREFERRED EMBODIMENTS

Figure 1:
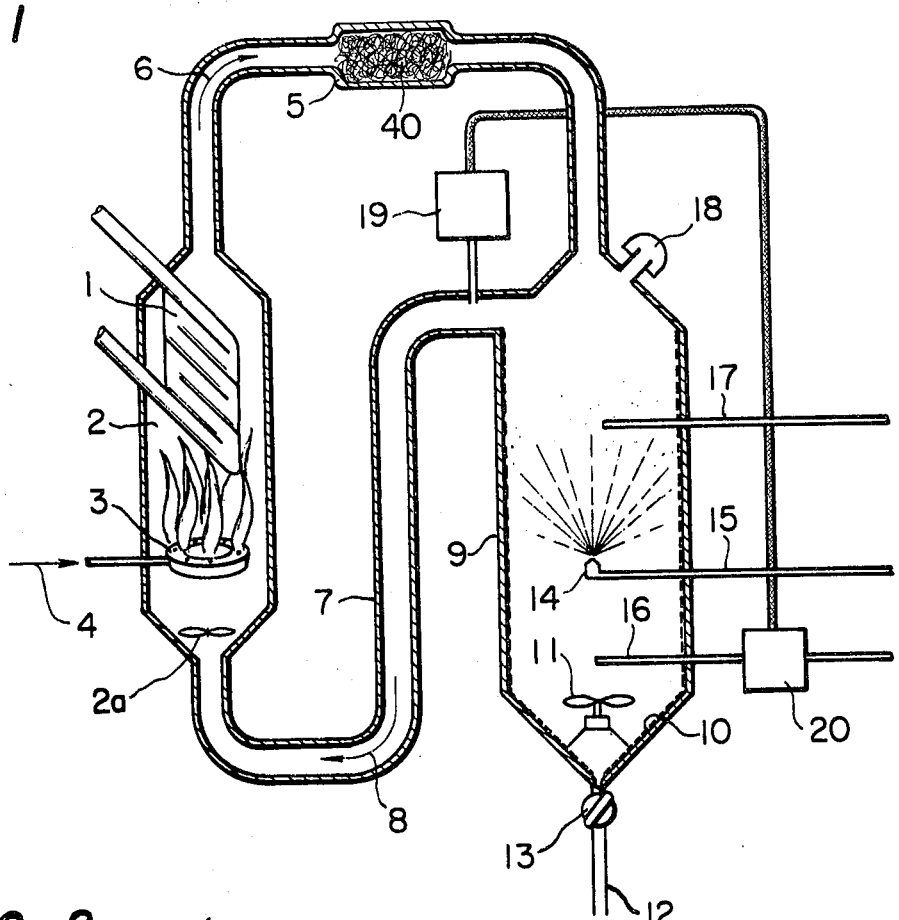
FIG. 1 is a schematic illustration of the present invention as applied to a steam boiler.

In FIG. 1, reference numeral 1 represents a gang of water pipes in a steam boiler. Numeral 2 represents a combustion chamber of the boiler. Numeral 3 represents a burner for effecting combustion in the boiler. These members can be of any conventional, commonly known type.

The fuel flows into the burner 3 as indicated by arrow 4. Combustion is caused to take place by the burner 3 while atmospheric air is excluded. The resulting gaseous products of combustion heat the water or other liquid contained in the gang of water pipes 1. The exhaust gases then flow, as indicated by arrow 6, through the exhaust gas duct 5 which can be a chimney or flue, and in which there is provided a catalytic decomposing device 40 for reducing carbon dioxide and water vapor, at least in part, into $H_2$, $O_2$ and $CO$. The gases pass through this device 40 and flow into the upper end of an exhaust gas cleaning tank 9. In this exhaust gas cleaning tank 9, the exhaust gases are treated to clean same in the manner as will be described hereinafter. The resulting clean exhaust gases are passed through a recirculation duct 7 as indicated by arrow 8 and are again fed to the combustion chamber 2 from the bottom thereof. The recirculation of the exhaust gases is carried out in this way.

In the exhaust gas duct 5 there is provided a catalytic decomposing device 40 for decomposing carbon dioxide and water vapor. This decomposing device serves to reduce a part of the carbon dioxide and water vapor, which are the main ingredients of the gaseous products of combustion, into carbon monoxide and oxygen and hydrogen and oxygen, respectively. The catalytic decomposing device itself consists of a known reducing catalyst such as platinum, platinum black and nickel black, etc. and this catalyst may be made with platinum wire or a metal wire, or platinum black or nickel black deposited on alumina, silica or other granulous carrier of porous structure. This decomposing device is constructed so as to have a number of passages for allowing the exhaust gases to flow therethrough freely. Metal catalysts have the advantage that they can be easily heated electrically.

The exhaust gas cleaning tank 9 is arranged so that the inner surfaces of the bottom portion thereof are lined with a rubber or rubber-like acid-resistant layer 10. At the bottom of the tank 9 there is provided a power-driven fan 11 for homogeneously mixing the gases to facilitate the contact of the exhaust gases with the fine mist of oxidant-absorbing aqueous solution supplied from a water mist spray means 14 which will be described hereinafter, to assure that complete absorption of $NO_x$ and $SO_x$ will be effected. Furthermore, at the extreme bottom of the exhaust gas cleaning tank 9 there is provided a drain pipe 12. At an appropriate location in this drain pipe 12 there is provided a discharge cock 13. Also, within said exhaust gas cleaning tank 9 there is provided a spray nozzle 14. This spray nozzle 14 is arranged to jet upwardly within said tank a fine aqueous mist of an aqueous solution of an oxidant-absorbing substance, in a more or less inverted conical form. The aqueous solution of the oxidant-absorbing substance is supplied through a high pressure supply pipe 15. Below said high pressure solution supply pipe 15 there is provided an oxygen supply pipe 16. The foremost end of this pipe 16 opens into the cleaning tank 9. Also, above said high pressure solution pipe 15 there is positioned a carbon dioxide supply pipe 17. The foremost end of this pipe 17 also opens into the cleaning tank 9. At or close to the upper end of the cleaning tank 9 there is provided a safety or pressure release valve 18 which is regulated or set to open at about one atmosphere pressure. This safety pressure valve 18 is arranged to function so that, when the pressure within the cleaning tank 9 exceeds atmospheric pressure (which occurs after some period of continuous combustion), the valve 18 opens automatically, for example, against the force of a spring provided therein (not shown) by the pressure of the gases contained in the cleaning tank 9, thereby to allow a part of the cleaned exhaust gases contained in the cleaning tank 9 to escape into the ambient atmosphere, whereas when the pressure within the cleaning tank 9 returns to about one atmosphere, the valve will automatically close, for example, by the action of the spring. Furthermore, one end of the recirculation duct 7 communicates with a lateral side of the cleaning tank 9 adjacent the upper end thereof. An $O_2$ content sensor 19 of a known type is provided in association with duct 7 to sense the oxygen content of the gas flowing through said duct. This oxygen content sensor 19 has one end opening into the end portion of the recirculation duct 7 near the site at which this duct 7 joins the cleaning tank 9. This $O_2$ sensor 19 detects the content of oxygen in the cleaned gases which are passing through the portion of the recirculation duct 7 in which the sensor 19 is positioned. The other end of the sensor 19 is connected to an oxygen flow rate computer and regulator unit 20 which maintains the proportion of oxygen to inert gases in the cleaned gases passing through the duct 7 to the combustion chamber 2, to insure a volumetric ratio of about 1 part by volume of oxygen to 4 parts by volume of inert cleaned exhaust gases, just like the ratio that exists between oxygen and nitrogen in atmospheric air. More specifically, the sensor 19 functions so that, when the oxygen content in the gas in duct 7 is smaller than the aforesaid proportion, it causes a valve in the $O_2$-regulator 20 to open wider to increase the rate of oxygen flow into the cleaning tank 9, whereas conversely when the gas in duct 7 contains an excess of oxygen, the sensor 19 commands the regulator 20 to narrow the degree of opening of the regulator 20 to decrease the rate of flow of oxygen into the tank 9. Oxygen sensors and control units for adjusting oxygen flow in response to sensed oxygen content of flowing gas streams are well-known, commercially available equipment.

In the closed combustion apparatus of the exhaust gas recirculation type arranged as shown in FIG. 1, the principal parts thereof, i.e. the combustion chamber 2, the exhaust gas duct 5, the cleaning tank 9 and the recirculation duct 7, are connected in series with each other to form a closed system and they are shut completely off from the ambient atmosphere. Moreover, the safety valve 18 is regulated to open at about 1 atmosphere pressure. Therefore, atmospheric air cannot invade the recirculation system, or more importantly, there cannot take place the entry of nitrogen into the recirculation system.

The fuel is supplied to the combustion burner 3 as shown by arrow 4, and it also is shut off from the atmosphere. Also, the oxygen which is necessary for the combustion is introduced as pure oxygen from an oxygen source or container (not shown) which may be installed separately on the ground, into the oxygen supply pipe 16 while also being shut off from the atmosphere. From this oxygen supply pipe 16, oxygen is supplied into the cleaning tank 9.

The main components of the exhaust gases are carbon dioxide and water vapor, which are the combustion (oxidaton) products of a fuel (chemically, a hydrocarbon). There is provided near the entrance of the exhaust duct 5 into the cleaning tank 9 a catalytic reducing (decomposing) device 40, which decomposes catalytically a part of the carbon dixoide ($CO_2$) into carbon monoxide and oxygen and also a part of the water vapor ($H_2O$) into hydrogen and oxygen. The oxygen which is produced from this decomposition is supplied to the combustion unit so that the amount of fresh oxygen which must be supplied from outside the system through $O_2$ supply pipe 16 can be reduced significantly. Also the streams of the thusproduced CO and $H_2$ (both inflammable gases) travel through the circulating duct 7 into the combustion chamber 2, whereby the fuel consumption can also be reduced.

In the cleaning tank 9 there is provided at the lower portion thereof a mixer fan 11 to effect homogeneous mixing of the cleaned exhaust gases with the oxygen supplied through the pipe 16. Thus, said oxygen is well mixed with the cleaned exhaust gases. The resulting mixed gases pass through the recirculation duct 7 in the direction of the arrow 8 and enter into the combustion chamber 2 from the bottom thereof. Thus the exhaust gas recirculation is completed. Flow of the mixed gas into the combustion chamber can be assisted by a fan 2a. These mixed gases constitute an artificial air, equivalent in effectiveness to ambient air, in which the nitrogen has been replaced by carbon dioxide and water vapor (both are chemically inert gases just like nitrogen) generated from the burning or combustion of fuel.

The main purposes of the cleaning tank 9 are firstly to reduce the temperature of the hot exhaust gases, and secondly to clean the exhaust gases by absorbing the oxidants ($NO_x$ and $SO_x$) generated by burning the fuel into an oxidant-absorbing solution. As such, the mode of combustion which takes place within the combustion chamber 2 hardly differs from the conventional combustion mode utilizing air. In addition, the apparatus is arranged to discharge a reduced amount of exhaust gases to the outside of the system, and these discharged gases contain practically no oxidants. Also, these mixed gases contain carbon monoxide and hydrogen which have been produced by catalytic reducing device 40 by decomposing carbon dioxide and water vapor, as stated above. The carbon monoxide and hydrogen are combusted again so that saving of fuel in the combustion unit can be achieved.

It should be understood, however, that at the time combustion is started, there are no exhaust gases present. For this reason, before ignition of the engine or burner, the cleaning tank 9 must be filled with 4 parts by volume of carbon dioxide and 1 part by volume of pure oxygen through the carbon dioxide supply pipe 17 and oxygen supply pipe 16, respectively. After combustion is started and when the combustion becomes stable, exhaust gases, whose main ingredients are carbon dioxide and water vapor, both being chemically inert gases like nitrogen, will be generated continuously by the combustion of the fuel. Whereupon, the supply of carbon dioxide from the supply pipe 17 is stopped.

During combustion, there is injected into the exhaust gases present in tank 9 a high pressure oxidant-absorbing solution in the form of a fine mist upwardly within the cleaning tank 9 from the spray nozzle 14. The high temperature of the exhaust gases, usually at about 500° to 600°C, which have flowed into the cleaning tank 9 through the exhaust gas duct 5 is lowered thereby to an appropriate degree, so that the gases recirculated through duct 7 have a temperature suitable for effecting smooth combustion in the burner 3. For example, when the fuel is gasoline, the recirculated exhaust gases are cooled to 80° to 90°C in tank 9, and when the fuel is kerosene, light oil or heavy petroleum oil, the recirculated exhaust gases are cooled to 120° to 130°C in tank 9. The temperature of the recirculated exhaust gases is reduced to a level below the boiling point of the fuel that is used so as to prevent boiling of the fuel in the feed pipe therefore or in the carburetor in the embodiment of FIG. 2. At the same time, the $SO_x$ and $NO_x$ contained in these exhaust gases originating from S or N contained in the fuel are absorbed by the very fine drops of the mist of the oxidant-absorbing solution. The fine drops of this solution which have absorbed $SO_x$ and $NO_x$, i.e. sulphuric acid and nitric acid, eventually fall down to the bottom of the cleaning tank 9 and accumulate therein as dilute sulphuric acid and dilute nitric acid. More specifically, the nitrogen and sulphur oxides arising from N and S originally contained in the fuel are collected as a drainable liquid due to said spraying. In the same way, fine particles of ash and carbon soot present in the exhaust gases are collected also. Both said liquid and said particles thus collected are discharged out of the system through the drain duct 12 by opening the cock 13.

Also, in the cleaning tank 9, relatively high density exhaust gases (carbon dioxide and water vapor) flow thereinto from the top thereof, and relatively low density oxygen is supplied at a position lower than that of feeding the exhaust gases into said tank. Because of the fact that a mixer fan 11 is provided near the bottom of the cleaning tank 9, the mixing of the exhaust gases with the freshly supplied oxygen is carried out rapidly and completely, and the resulting homogeneous mixed gases are fed as a uniform gas phase, in other words as an artificial air containing no nitrogen, to the combustion chamber 2.

As combustion takes place continuously, the fuel is oxidized and decomposed into $CO_2$ and $H_2O$. Accordingly, the volume of the exhaust gases will increase progressively, eventually causing the pressure within the closed cleaning tank 9 to increase accordingly. When this gas pressure within the cleaning tank 9 exceeds atmospheric pressure, the safety pressure valve 18 is actuated automatically to discharge the excess gases present in said cleaning tank 9 into the atmosphere outside the system. As a result, the pressure in the entire combustion system is automatically kept at about atmospheric pressure, so that the fuel will burn continuously to produce flame smoothly.

Figure 2:
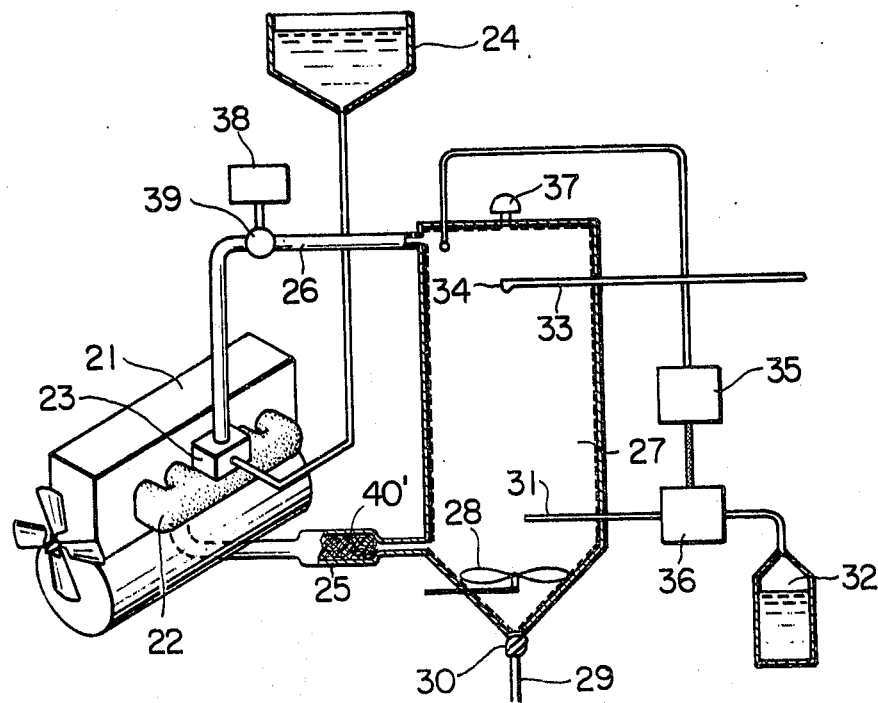
FIG. 2 is a schematic illustration of the present invention as applied to an internal combustion engine.

In FIG. 2, reference numeral 21 indicates a gasoline engine which can be any known type of internal combustion engine. Numeral 22 indicates the intake manifold. Numeral 23 indicates a carburetor, and 24 indicates a fuel container or gasoline tank containing gasoline fuel. Numeral 25 indicates an exhaust duct, in which there is installed a catalytic decomposing device 40' for decomposing carbon dioxide and water vapor, in the same manner as in the exhaust gas duct 5 of the preceding example of FIG. 1. Numeral 26 indicates a mixed gas feed pipe having one end communicating with a cleaning tank 27 and the other end communicating with the carburetor 23 and having a T-type cock 39 midway therein. Numeral 28 idicates a mixer fan, of the same type as that indicated at 11 for the preceding example, which is provided just above the bottom of said cleaning tank 27. Numeral 29 indicates a drain discharging pipe which is similar to the drain pipe 12 of the preceding example. Numeral 30 indicates a drain discharge cock which is also similar to the cock 13 of the preceding example. Numeral 31 indicates an oxygen supply pipe which is similar to the oxygen supply pipe 16 of the preceding example, and 32 indicates a liquefied oxygen container (light weight aluminum or stainless steel foil Dewar vessel) in which liquefied oxygen, which is the source of oxygen, is stored in the case of an automobile. Numeral 33 indicates a high pressure pipe for supplying oxidant-absorbing solution similar to the spray pipe 15 in the preceding example, and 34 indicates a spray nozzle for injecting a fine mist of the oxidant-absorbing solution supplied from the high pressure pipe 33 downwardly in this example into the cleaning tank 27. Numeral 35 indicates an oxygen concentration analyzing sensor which is similar to the sensor 19 used in the preceding example. Numeral 36 indicates an oxygen flow rate computing regulator unit connected to the oxygen concentration sensor 35, and which is similar to the regulator 20 of the preceding example. Numeral 37 indicates a safety valve which is similar to the safety valve 18 employed in the preceding example. Numeral 38 indicates a conventional air cleaner for air intake, which is used only for the initial starting of engine 21. The T-way cock 39 is arranged to be operative to perform a connection or change-over action so that atmospheric air is supplied only for a transitional short period of time at the inital starting of the engine 21 after the engine has been stopped. More specifically, after the engine 21 is operating in a stable fashion several minutes after starting, the T-way cock 39 will be turned so as to block communication with atmospheric air and to connect the carburetor 23 with the cleaning tank 27, thereby cutting off inflow of air from the air cleaner 38. When this happens the combustion system is transformed to the closed state, in other words transforming the system to the 100 percent exhaust gas recirculation mode in conjunction with the supply of pure oxygen.

In the closed combustion apparatus arranged as described above in a gasoline engine, the main parts of the apparatus, e.g. the combustion chamber of the gasoline engine 21, the intake manifold 22, the carburetor 23, the exhaust duct 25 in which is installed a catalytic reducing device 40' for $CO_2$ and $H_2O$, the cleaning tank 27 and the carbon dioxide (about 80 percent) and oxygen (about 20 percent) mixed gas (an artificial air without nitrogen) inhaling pipe 26, are shut off from the atmosphere, and also the safety valve 37 is regulated at about 1 atmosphere pressure. Accordingly, there does not occur the entry of atmospheric air into the recirculation system, the same as in the case of the preceding example. In other words, entry of nitrogen into the system does not occur. However, discussion will be made hereinbelow with respect to the specific instance of starting the engine. For the convenience of explanation, however, a description will be made first with respect to the operation of the engine 21 at the time that it has proceeded to stable operation.

Gasoline which is a fuel necessary for combustion is supplied to the carburetor 23 from the gasoline tank 24. Also, the oxygen which is required for combustion in a closed system is supplied, through vaporization of the pure liquefied oxygen which is contained in the oxygen container 32, directly to the cleaning tank 27 through the oxygen computer and regulator unit 36 and the supply pipe 31. In this cleaning tank 27, the powerful mixer fan 28 rotates for effecting complete and homogeneous mixing of the relatively heavy carbon dioxide and water vapor with the lighter weight oxygen gas. Oxygen is supplied also as a result of decomposition of carbon dioxide and water vapor which are the main components of exhaust gases, and this supply of oxygen is carried out by the decomposing device 40' as in the preceding example. The remaining products of this decomposition, namely, CO and $H_2$, also contribute to a reduction of the gasoline consumption just as in the preceding example. As a result, said oxygen is thoroughly mixed with the cleaned exhaust gases (the main ingredients being carbon dioxide and water vapor). The resulting mixed gases are passed through the mixed gas inhale pipe 26 and are introduced into the carburetor 23, and therefrom to the engine 21. These mixed gases are equivalent in effect to an artificial air in which the nitrogen is replaced by carbon dioxide and water vapor of the exhaust gases, as stated previously, because they both are chemically inert gases just like nitrogen. Therefore, the combustion or explosion which takes place in the combustion chamber of the gasoline engine 21 is not significantly different in mode from the ordinary combustion or explosion which is performed by utilizing atmospheric air. Thus, here again there are generated substantially no oxidants. Also, as stated above, these mixed gases contain carbon monoxide and hydrogen which have been produced by the passage of the mixed gases through the catalytic reducing device 40' for $CO_2$ and $H_2O$ vapor. The carbon monoxide and hydrogen are again combusted in the combustion chamber, so that the consumption of fuel in the gasoline engine or external combustion furnace can be reduced.

During operation, a high pressure aqueous solution of oxidant-absorbing substance, for example, $KMnO_4$ and $KOH$, is injected in fine mist form downwardly in this example from the spray nozzle 34 from time to time or continuously into the cleaning tank 27. Whereupon, the high temperature of the exhaust gases which have flowed into the cleaning tank 27 is lowered to an appropriate level by said spray, and at the same time, $NO_x$ and/or $SO_x$ generated from the fuel and contained in the exhaust gases are absorbed by said mist and are converted to dilute nitric acid and/or dilute sulphuric acid which accumulate as a drainable liquid in the bottom of the cleaning tank 27. Although gasoline contains hardly any nitrogen or sulphur, if it does contain them, the oxidant products thereof are recovered together as a drainage liquid by said spray in the manner described above. Thereafter, in a manner similar to that described in connection with the preceding example, the drainage liquid is discharged out of the system when the cock 30 is opened. Also, the safety valve 37 is actuated by the pressure within the cleaning tank 27 in a manner similar to that discussed in connection with the preceding example, and it serves to maintain the safety and stability of operation at all times.

Furthermore, the oxygen content sensor 35 actuates the oxygen flow rate regulator unit 36 in a manner similar to that stated in connection with the preceding example, and the mixing ratio of the mixed gases which are supplied from the cleaning tank 27 to the mixed gas feed pipe 26 is set at about 1 part by volume of oxygen to about 4 parts by volume of cleaned exhaust gas mixture, principally consisting of carbon dioxide and water vapor.

In FIG. 2, since the circulation system is of the closed type (essentially 100 percent recirculation type), it will be understood that, when the engine 21 has been stopped for only a short time, the exhaust gases will remain stored in the cleaning tank 27 in an amount sufficient for restarting the engine. Therefore, the engine 21 can be started again without any trouble. However, in the event that this stoppage of the engine continues for a substantial length of time, it should be understood that since, in the case of an automobile engine, the cleaning tank 27 cannot be completely air-proof, at the restarting of the automobile engine after, for example, an overnight or a longer rest, there could occur trouble in starting the engine. In such case, the T-way cock 39 can be opened for communication with the atmospheric air, like an ordinary automobile, so that the engine 21 can be started without any trouble. After several minutes of slow running of the engine to warm up the engine, the connection of the T-way cock 39 should be changed over to establish a closed circuit as described above.

According to the conventional E.G.R. (exhaust gas recirculation) System, only 10–15 percent of the exhaust gases can be recirculated, because there is no oxygen present in the recirculated exhaust gases so that, if a greater amount of exhaust gases were recirculated, the engine 21 will operate improperly or stop, owing to lack of oxygen. However, by adopting the system or circuit of the present invention, essentially 100 percent of the exhaust gases can be recirculated without causing the engine to stop running because the necessary quantity of pure oxygen is supplied from liquid oxygen reservoir 32.

According to the present invention, there is the advantage that the conventional combustion apparatuses (external and internal combustion apparatuses) can be used without substantially modifying their structures, by adding only the cleaning tank and associated equipment.

The method and the apparatus of the present invention can be most advantageously applied to steam boilers, gas turbine engines and other internal as well as external combustion engines, furnaces and systems.

The embodiments of the invention in which an exclusive property or privilege is claimed are defined as follows:

1. A method for performing combustion, employing a combustion system of the closed circulation type having a combustion means and means to lead the exhaust gas produced from the combustion means to a cleaning means for removal of oxidant constituents from the exhaust gas, which comprises:

while excluding the entry of air into the combustion system, carrying out the steps of supplying the oxygen required for combustion into the cleaning means from a pure oxygen source provided outside of the system, mixing said oxygen with cleaned exhaust gas within the cleaning means to form an oxygen-containing gas which is capable of supporting combustion and is essentially free of nitrogen, supplying a fuel into the combustion means from outside the system, feeding the oxygen-containing gas to said combustion means and effecting combustion of the fuel with said oxygen-containing gas, feeding the exhaust gas from said combustion means to said cleaning means and therein removing oxidants thereform to form said cleaned exhaust gas, and discharging excess exhaust gas contained in the cleaning means to the outside of the system to maintain the pressure of the oxygen-containing gas fed to said combustion means at a value capable or providing stable combustion conditions.

2. A method according to claim 1, including the further step of decomposing a part of the carbon dioxide and the water vapor which are contained in the exhaust gas from the combustion means into carbon monoxide, hydrogen and oxygen, respectively, before the exhaust gas is introduced into the cleaning means.

3. A method according to claim 2, in which said cleaned exhaust gas is composed mainly of carbon dioxide and water vapor, and the oxygen is supplied thereto at a mixing ratio of about 1 part by volume of oxygen to about 4 parts by volume of cleaned exhaust gas.

4. A method according to claim 1, including the further steps of, in the cleaning means, reducing to an appropriate level the temperature of the exhaust gas entering the cleaning means from the combustion means and simultaneously collecting $NO_x$ and $SO_x$ formed during combustion and contained in the exhaust gas, by injecting under high pressure a fine mist of an aqueous solution into said exhaust gas in said cleaning means and thereby causing the mist to absorb said $NO_x$ and $SO_x$ to form a drainage liquid, and discharging this drainage liquid to the outside of the system.

5. A method according to claim 1, including the further step of discharging to the outside of the sytem through a pressure relief valve, a portion of the accumulated cleaned exhaust gas in said cleaning means whenever the pressure of said gases exceeds a certain level, thereby to keep the pressure within the cleaning tank below a selected level.

6. A method according to claim 1, including the further step of supplying carbon dioxide into the cleaning means from a source of pure carbon dioxide provided outside the system.

7. A method according to claim 1, in which said combustion system is a steam boiler, a gas-turbine engine, an internal combustion engine, an external combustion engine, or a furnace.

8. A method according to claim 1, wherein said pure oxygen source is either a source of gaseous or liquefied oxygen, and feeding this gaseous or liquefied oxygen into the cleaning means.

9. A method according to claim 7, in which this pure oxygen source and the leading of this oxygen to the cleaning tank is applied to the combustion system of a gasoline engine.

10. A closed combustion apparatus of the exhaust gas recirculation type, comprising:

A closed circulation circuit comprised of a combustion chamber having combustion means therein, an exhaust gas cleaning chamber conncted by an exhaust gas duct to said combustion chamber and a recirculation pipe connecting said cleaning chamber back to the combustion chamber, said cleaning chamber having therein exhaust gas cleaning means for removing oxidant constituents from the exhaust gases supplied from the combustion chamber through said exhaust gas duct, all of which are blocked from communication with the ambient air, a fuel supply means for supplying fuel into the combustion chamber from outside the circuit and which is blocked from communication with the ambient air, an oxygen supply means for supplying oxygen into said cleaning chamber from a pure oxygen source provided outside thereof and which is blocked from communication with the ambient air, means provided in the cleaning chamber for mixing said oxygen with the cleaned exhaust gases in said cleaning chamber, and means provided on the cleaning chamber for discharging excess exhaust gases to the outside of the circuit.

11. An apparatus according to claim 9, further comprising a decomposing device provided in said exhaust gas duct for decomposing, before the exhaust gases are introduced into the cleaning chamber, a part of the carbon dioxide and the water vapor which are contained in the exhaust gases into carbon monoxide and oxygen, and hydrogen and oxygen, respectively.

12. An apparatus according to claim 9, in which said cleaning chamber has a mixing fan provided in the vicinity of the bottom of said cleaning chamber.

13. An apparatus according to claim 9, in which said cleaning chamber has, in the vicinity of its top, a pressure relief valve actuated by the internal pressure of said cleaning chamber for discharging exhaust gases contained in the cleaning chamber to the outside of the apparatus.

14. An apparatus according to claim 9, in which said cleaning chamber has therein a spray nozzle connected to an outside pressurized aqueous solution supply means for producing a pressurized jet of fine aqueous solution.

15. An apparatus according to claim 9, in which said cleaning chamber has, at the bottom thereof, a drainage discharge pipe.

16. An apparatus according to claim 9, in which an oxygen flow rate regulator unit is provided in the pipe line of said oxygen supply means and a sensor is operably connected to this regulator and is arranged for sensing the amount of oxygen contained in the mixed gases supplied from the cleaning chamber to the combustion chamber.

17. An apparatus according to claim 9, in which said cleaning chamber has a carbon dioxide gas charging pipe opening in said chamber.

* * * * *